Patented Mar. 10, 1925.

1,529,261

UNITED STATES PATENT OFFICE.

SIMON J. LUBOWSKY, OF JERSEY CITY, NEW JERSEY.

METHOD OF PRODUCING CRYSTALLINE OXIDE OF TIN.

No Drawing.   Application filed April 7, 1923.   Serial No. 630,603.

*To all whom it may concern:*

Be it known that I, SIMON J. LUBOWSKY, a citizen of the United States, and a resident of Jersey City, in the county of Hudson and State of New Jersey, have invented certain new and useful Improvements in Methods of Producing Crystalline Oxide of Tin: and I do hereby declare the following to be a full, clear, and exact description of the invention, such as will enable others skilled in the art to which it appertains to make and use the same.

The invention relates to a novel method of producing crystalline oxide of tin from hydrated oxides of that metal, the conversion being effected by means of a special heat treatment which may be carried on in the ordinary atmosphere and without the addition of chemicals, the resultant product being very fine grained anhydrous tin oxide in which the color values, ranging from yellow through white to various shades of pink and old rose, may be accurately regulated by the use of specific temperatures applied for co-ordinated intervals of time. The critical temperatures are considerably higher than those heretofore employed in converting tin hydroxides into anhydrous oxide, ranging between 2000° and 2200° F., according to the particular color which is desired in the resultant oxide.

According to the common methods of producing tin oxide by precipitation from stannate solutions, or other solutions of tin salts, the oxide is in hydrated form, containing various amounts of water in chemical composition depending upon the method of precipitation. In drying the precipitate for commercial use, part of this water is lost, but varying amounts, from 8 per cent to 10 per cent, remain in the material after it has been dried at temperatures not materially above the boiling point of water. When this material is heated in a furnace, it first turns brown, and as the temperature increases, it assumes a yellow color, which becomes gradually lighter, and the final light yellow or greenish cream color, which the product attains at a temperature somewhat below 1900° F., the upper limit of the calcining temperature heretofore employed, is characteristic of anhydrous precipitated tin oxide, which latter is the commercial article usually known and sold as tin oxide. The latter has been found unsatisfactory in many of the technical applications, because it is lacking in the desirable color values and in stability.

I have found that if hydrated tin oxides, obtained by any of the commercial precipitating methods, are treated to temperatures in excess of 900° F., and preferably to temperatures between 2000° and 2200° F., for a sufficient length of time, the material gradually changes color, passing from yellow through white to various shades of pink and old rose, the heating being performed in contact with air and without the addition of chemicals or other materials. This specific heat treatment permits of the perfect control of the color value of the resultant tin oxide. For example, in order to obtain the purest and most desirable white oxide, suitable for producing enamels and glazes for fine pottery ware, it is only necessary to arrest the heat treatment when the particular color value has been reached, and, similarly by increasing the temperature and prolonging the time of calcination for the tin oxide to take on a pink or old rose color, so that by arresting the heat treatment, when the desired color value is manifested, the ultimate product will consist of an anhydrous tin oxide in finely divided crystalline form, possessing any selected shade of pink or old rose, the color being fixed and permanent.

In addition to possessing the superior color values obtained by the heat treatment within the temperature range indicated, the resultant product is anhydrous tin oxide of very fine crystalline form, which renders the same much more effective and desirable in the particular technical arts to which tin oxides have long been applied.

What I claim is:

1. The method of producing a colored crystalline oxide of tin from precipitated tin hydroxides, which comprises heating the initial product at a temperature above 1900° F., for a period of time sufficient to produce the desired color value, and suspending the heat treatment, when the desired color value is shown.

2. The method of producing a colored crystalline oxide of tin from precipitated tin hydroxides, which comprises heating the initial product at a temperature between 2000° F. and 2200° F., for a period of time sufficient to produce the desired color value, and suspending the heat treatment, when the desired color value is shown.

3. The method of producing a colored crystalline oxide of tin from precipitated tin hydroxides, which comprises heating the initial product at a temperature above 1900° F., for a period of time sufficient to produce the desired color value and stability, and suspending the heat treatment, when the desired color value is shown.

In testimony whereof I affix my signature.

SIMON J. LUBOWSKY.